R. B. GRAY.
PNEUMATIC TIRE.
APPLICATION FILED OCT. 14, 1909.
1,005,960.
Patented Oct. 17, 1911.
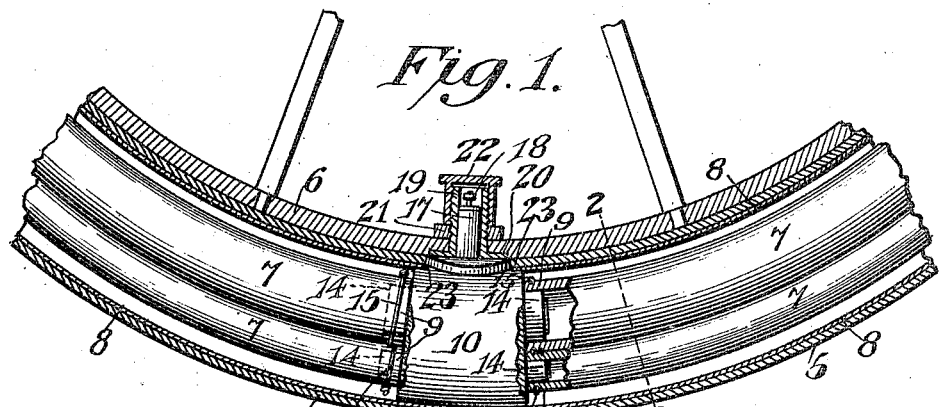
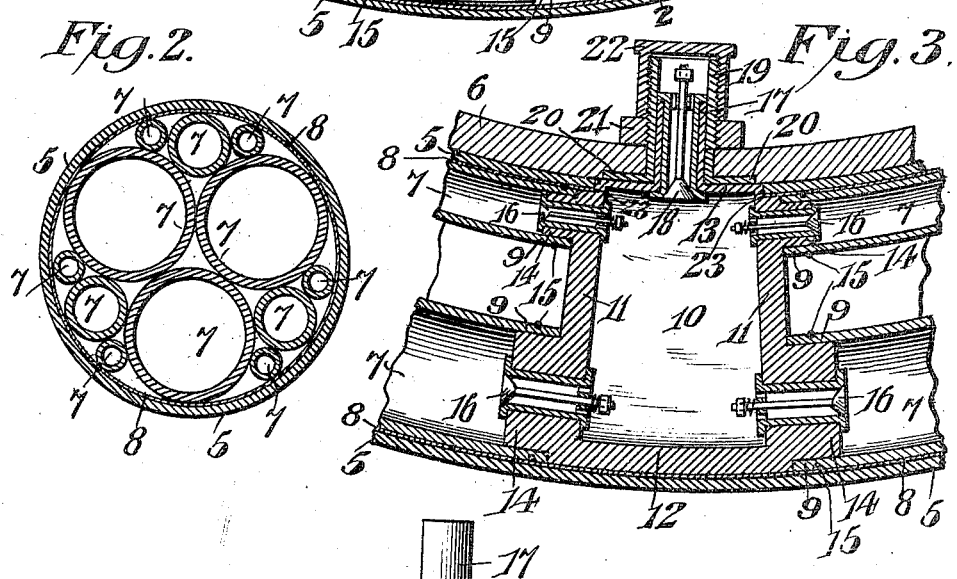
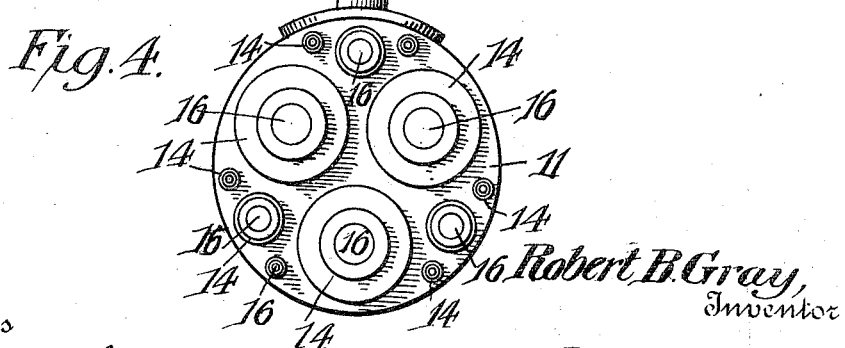
Robert B. Gray, Inventor
Witnesses

UNITED STATES PATENT OFFICE.

ROBERT B. GRAY, OF PORT CARBON, PENNSYLVANIA.

PNEUMATIC TIRE.

1,005,960.

Specification of Letters Patent.  Patented Oct. 17, 1911.

Application filed October 14, 1909. Serial No. 522,579.

*To all whom it may concern:*

Be it known that I, ROBERT B. GRAY, a citizen of the United States, residing at Port Carbon, in the county of Schuylkill and State of Pennsylvania, have invented a new and useful Pneumatic Tire, of which the following is a specification.

This invention relates to an improvement in pneumatic tires designed especially for use in connection with automobile wheels, although, of course, it can be employed equally as well with bicycles or the like.

The object of the invention is to provide a pneumatic tire of a novel construction which cannot be completely deflated and which can be easily and quickly repaired whenever desired.

With these and other objects in view, the invention consists in certain novel features hereinafter fully described, illustrated in the accompanying drawing, and pointed out in the claim hereto appended; it being understood that various changes in the form, proportion, size, and minor details of construction, within the scope of the claim, may be resorted to without departing from the spirit or sacrificing any of the advantages of the invention.

In the drawing:—Figure 1 is a detail longitudinal section through a portion of the tire and wall. Fig. 2 is a transverse section of the same taken on the line 2—2 of Fig. 1. Fig. 3 is an enlarged detail longitudinal section of the tire, showing the same in position on the rim of the wheel, and also showing the ends of the inner tubes and the communicating air chamber, and Fig. 4 is an end view of the air chamber, showing the tube connecting nipples extending therefrom.

Like reference numerals designate corresponding parts in all the figures of the drawing.

Referring to the drawing, an outer tube 5 of the usual type is arranged on the rim 6 of an ordinary wheel.

The invention comprises a plurality of inner tubes 7 of various diameters which are incased in a thin tubular cover or casing 8 of any suitable material. By employing tubes of different diameters, it will be readily apparent, from an inspection of Fig. 2 that the said casing 8 can be more completely filled with the said tubes. These tubes are open-ended and extend around the wheel and have their respective ends 9—9 connected to an air-chamber or compartment 10, as will be hereinafter fully described. This chamber is formed of rubber or other flexible material, and comprises spaced side walls 11—11 that are arranged transversely of the tire, and an outer wall or tire portion 12, the said side walls and the outer wall being of a greater thickness than the depressed circular inner wall or rim portion 13. This chamber is formed in one piece, and is provided on the outer faces of the side walls 11—11 with projecting nipples 14 which are preferably formed integral with the said chamber. These nipples vary in size, depending on the diameters of the inner tubes 7. The ends 9 of the said inner tubes 7 are respectively arranged to slip over and engage these nipples, and are retained thereon by a clamping wire or other suitable means 15. Check valves 16, of any suitable construction, are respectively arranged within the nipples and communicate with the interior of the inner tubes and the air-chamber 10. The inner wall or rim portion 13 of the air-chamber is provided centrally with an integral and upstanding resilient tube 17, within which is arranged a check valve 18 of ordinary construction and adapted to admit air first into the air-chamber 10 and thence simultaneously through the check valves 16 into the ends 9—9 of the inner tubes 7. An exteriorly threaded sleeve 19 is arranged around the upstanding tube 17 and is provided with an outwardly extending flange 20 at its base, said flange being preferably seated within the rim 6 and bearing directly against the inner wall 13 of the air-chamber. A nut 21 is screwed onto the said sleeve 19 and is adapted to retain the sleeve in position by clamping the rim between the flange 20 and the said nut 21. An internally threaded cap 22, of ordinary construction, is screwed onto the sleeve 19 above the nut 21, and is adapted to cover the said sleeve and thereby prevent anything accidentally coming in contact with the check valve 18.

In assembling the tire, the inner tubes are first connected at one end to the nipples 14 of the air-chamber by the clamping wire 15. The tubes are then inserted in the covering 8 and are moved along within said covering until the opening 23 in the said cover is reached. This opening surrounds the inner wall 13 of the air-chamber. The tubes are then inserted within the outer tube 5 and are drawn along within the same, until the opening therein registers with the inner wall 13 of the air-chamber. The free ends of the inner tubes are then connected to the nipples 14 of the other side wall of the air-chamber by the said fastening means 15. The sleeve 19 is positioned in the rim 6, and the tube 17 is positioned within the said sleeve. The check valve 18 is then positioned in place, and the nut 21 screwed onto the said sleeve, after which the cap 22 is applied.

From the foregoing, it will be readily apparent that when air is forced into the air-chamber 10 by a hand pump or other suitable means, all of the check valves 16 will be simultaneously operated by the pressure within the air-chamber. The air will then pass through the said check valves and into the inner tubes 7. Thus it will be seen, that pressure is exerted equally upon both ends of the inner tubes. After the said inner tubes have been sufficiently inflated, the pressure therein will, of course, close the check valves 16. Should, however, the tire pass over any puncturing agent, as for instance, a tack, the entire tire will not be deflated, because the said tack or other agent will only puncture the tube with which it came in contact. Though the punctured tube will be deflated, the remaining tubes will remain inflated and their inflation will hold them firmly against the covering and the covering clamped against the inner surface of the outer tube. It is of course possible that the tack may not even puncture one of the tubes, as it may pass between any two of the said tubes. It will thus be apparent, that although one of the inner tubes might be punctured, the tire remains nearly in a normal inflated condition. It is then only necessary to withdraw that particular tube from the tire and replace the same with a new one, which may be done at any time after the vehicle has reached its destination.

The novel feature of this invention resides particularly in an interior chamber located between the ends of the inner tubes and incased within the tire and connected to both ends of all the tubes so that the distribution of the air to the tubes in inflating the tire is direct, and inflation is accomplished with greater ease and less expenditure of effort.

It will be noted that the inner wall 13 of the chamber projects through the openings provided in the inner walls of the inner casing and outer tube, and forms a closure for said openings, and that the said inner wall 13 is disposed flush with said outer tube. It will also be seen that the flange 20 of the sleeve 19 bears upon the inner wall 13 and is interposed between said inner wall and the rim of the wheel.

What I claim is:—

In combination with an outer tube, a series of open-ended separate tubes of varying diameters within the same, and removable collectively or individually therefrom, a normally-closed air chamber arranged transversely within the casing and comprising an outer wall an inner wall and opposite side walls to which the ends of all the tubes are fastened, the outer tube having an opening in the inner wall thereof, said opening permitting the inner end of the chamber to project through and form a closure for the same, a tube projecting from the inner wall of the chamber, and a check valve in said tube.

In testimony, that I claim the foregoing as my own, I have hereto affixed my signature in the presence of two witnesses.

ROBERT B. GRAY.

Witnesses:
Wm. G. Wells,
Frank Little.

Copies of this patent may be obtained for five cents each, by addressing the "Commissioner of Patents, Washington, D. C."